United States Patent [19]

Yamamoto et al.

[11] 3,933,617

[45] Jan. 20, 1976

[54] ELECTRODIALYSIS APPARATUS

[75] Inventors: Tosinori Yamamoto; Takeo Utunomiya, both of Chiba; Sigeharu Otuka, Tokyo, all of Japan

[73] Assignee: Asahi Glass Co., Ltd., Tokyo, Japan

[22] Filed: Jan. 25, 1974

[21] Appl. No.: 436,678

[52] U.S. Cl. .......................... 204/301; 204/180 P
[51] Int. Cl.² ................................. B01D 13/02
[58] Field of Search .................. 204/301, 180 P

[56] References Cited
UNITED STATES PATENTS

| | | | |
|---|---|---|---|
| 2,881,124 | 4/1959 | Tye | 204/301 |
| 2,894,894 | 7/1959 | Kressman et al. | 204/301 |
| 2,948,668 | 8/1960 | Whalley et al. | 204/301 |
| 3,201,339 | 8/1965 | Tsunoda et al. | 204/301 |
| 3,219,572 | 11/1965 | Zwart, Jr. | 204/301 |
| 3,284,335 | 11/1966 | Tsunoda et al. | 204/301 |

*Primary Examiner*—Howard S. Williams
*Assistant Examiner*—A. C. Prescott
*Attorney, Agent, or Firm*—Oblon, Fisher, Spivak, McClelland & Maier

[57] ABSTRACT

A filter-press type electrodialysis apparatus imparts excellent uniform distribution of the liquid within the diluting and concentrating cells and low leakage of the liquid between the cells due to the fact that the liquid feeding or discharging means of the cells are formed separately from the body of the cell frame and of a rigid material having a thickness not more than and preferably less than the thickness of the cell frame body, which is formed of an elastic material, whereupon assembly of the elements, the cell frames are compressed together while the feeding or discharging means are substantially non-compressed, thereby preventing leakage.

7 Claims, 8 Drawing Figures

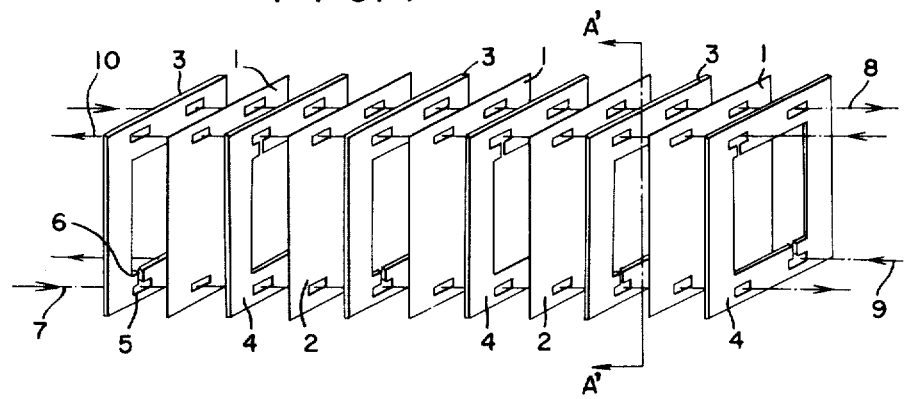
FIG. 1
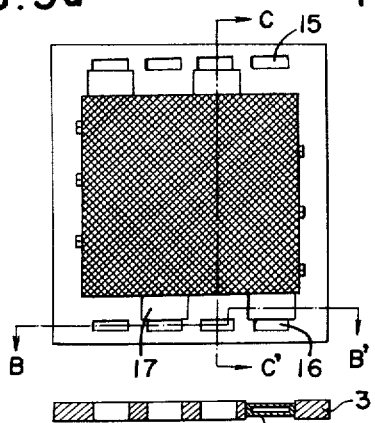
FIG. 3a
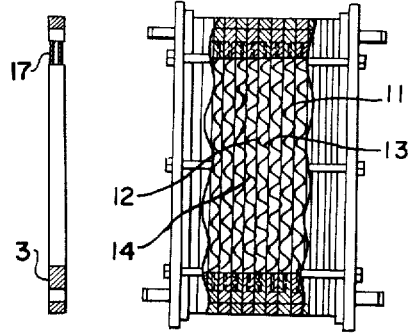
FIG. 3c   FIG. 2a
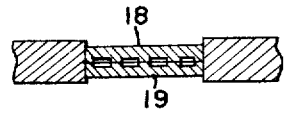
FIG. 3b
FIG. 4a
FIG. 4b
FIG. 4c
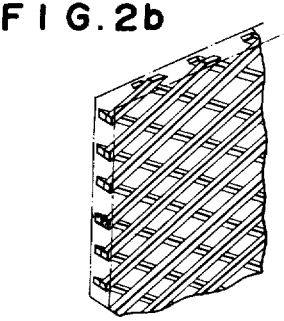
FIG. 2b

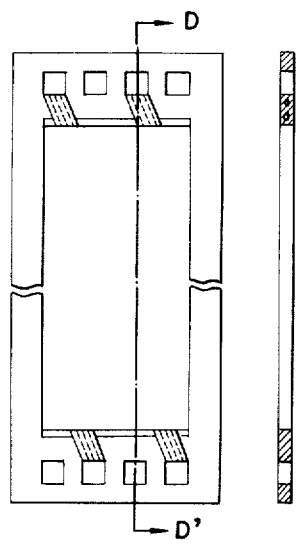
FIG. 5a
FIG. 5b
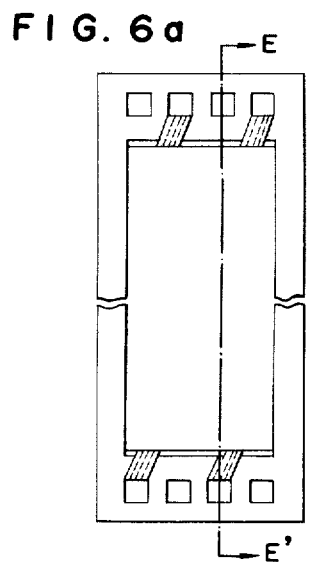
FIG. 6a  FIG. 6b
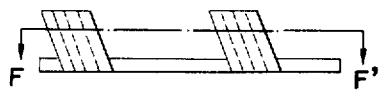
FIG. 7a
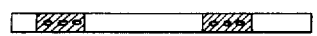
FIG. 7b
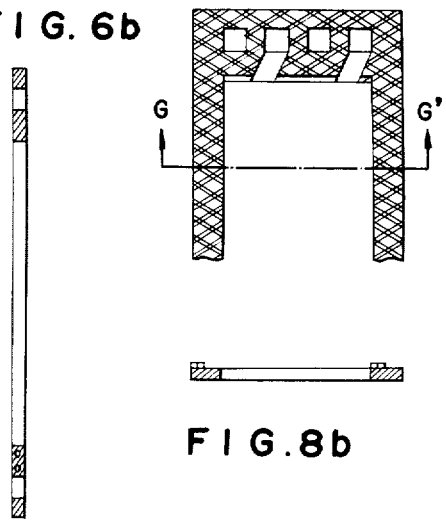
FIG. 8a
FIG. 8b

ELECTRODIALYSIS APPARATUS

BACKGROUND OF THE INVENTION

1. Field of the Invention

The present invention relates generally to filter-press type electrodialysis apparatus in which cation exchange membranes and anion exchange membranes are alternately arranged between cell frames and spacers provided therein, and more particularly to an improved filter-press type electrodialysis apparatus which imparts excellent uniform distribution of the liquid within the diluting and concentrating cells and imparts low leakage of the liquid, from one cell through apertures within the frame to another cell, and/or discharged between the cell frames.

2. Description of the Prior Art

Filter-press type electrodialysis apparatus have been used for concentration or demineralization of electrolytes from various solutions containing electrolytes, such as for example, saline water, electroplating waste, radioactive waste, sugar solution cheese whey, organic acid solutions, or the like. In such electrodialysis apparatus, it is quite important to impart uniform distribution of the liquid to be electrodialyzed within the cell chambers and to prevent leakage of the liquid from one cell to another or from the area between the cell frames.

The uniform distribution of the liquid within the cells is closely related to the limiting current density within each of the cells (Industrial and Engineering Chemistry, Vol. 49, No. 4 page 780, 1957), and when the distribution of the liquid is different within each of the cells, the corresponding limiting current density is presented to each cell. Consequently, the limiting current density of the apparatus is controlled at the lowest value of the various limiting current densities and accordingly, the efficiency of such an apparatus is low. It has therefore been attempted to impart uniform distribution of the liquid within the cells, however, it has been relatively difficult to maintain such uniform distribution of the liquid within a commercial scale apparatus.

Similarly, leakage of the liquid between cells causes contamination of the dialyzed liquid whereby the electrodialysis operation itself becomes meaningless. Accordingly, it is quite important to prevent leakage of the liquid, and various proposals dealing with the liquid feeding or discharging means of the cells, which are the passages connecting the central opening portions of the cell frames to conduit apertures within the cell frames, have been made.

For example, the following structures have been known:

1. A portion of the cell frame, leading from the conduit apertures of the cell frame to the central opening, is deleted so as to form a passage for the liquid within a narrow area.

2. A portion of the cell frame, leading from the conduit apertures of the cell frame to the central opening, is deleted and spacers made of rough fabric and having a thickness not less than the thickness of the cell frame, are disposed within the deleted portion of the cell frame.

3. A portion of the cell frame leading from the conduit apertures of the cell frame to the central opening is deleted as in the instance of the apparatus of (2) above and an elastic material having projections which have a thickness not less than the thickness of the cell frame is disposed within the deleted portion.

However, these conventional contrivances could nevertheless not impart uniform distribution of the liquid to the cells or could not treat a sufficient amount of the liquid within an operative cycle of the apparatus with high efficiency. When such proposals have been applied to a commercial scale apparatus, the purposes and goals could not be accomplished to an extent which would sufficiently obviate the problem. Especially within the instance of the apparatus of (3) above, the passage for the liquid is formed by a contraction of the elastic projections. Accordingly, the passages of the liquid are different within each of the cells, and obviously are not uniform. Moreover, in commericial scale apparatus, it is especially difficult to uniformly secure all of the cell chambers within the apparatus, and under such conditions, the distribution of the liquid within the cell chambers is quite non-uniform, and the limiting current density which indicates the level of safe operation of the apparatus, fluctuates among the cells and it is quite disadvantageous for efficient operation of the electrodialysis apparatus.

SUMMARY OF THE INVENTION

Accordingly, it is an object of the present invention to provide a filter-press type electrodialysis apparatus which imparts uniform distribution of the liquid within the cells and low leakage of the liquid from one cell to another cell and/or also discharged between the cell frames.

Another object of the present invention is to provide a filter-press type electrodialysis apparatus which exhibits the aforenoted characteristics of uniform distribution and low leakage of the liquid even though the size of the cell frames is large for application within commercial scale apparatus.

Still another object of the present invention is to provide a filter-press type electrodialysis apparatus which exhibits low leakage of the liquid even though the cell frames are assembled under relatively low pressure conditions.

Yet another object of the present invention is to provide a filter-press type electrodialysis apparatus which maintains the uniform distribution of the liquid within the cells eventhough the cells are secured under high pressure conditions for completely preventing leakage of the liquid within the cells.

A further object of the present invention is to provide a filter-press type electrodialysis apparatus which maintains the uniform distribution of the liquid and which is easily assembled or disassembled.

These foregoing objects are achieved according to the present invention through the provision of electrodialysis apparatus which includes a plurality of alternately disposed anion exchange membranes and cation exchange membranes and cell frames interposed between the membranes such members being arranged and fastened between a pair of electrodes, wherein the passage portion of the cell frames, connecting the central opening of the frames to apertures within the cell frames, for feeding or discharging the liquid to or from the cells is formed separately from the body of the cell frame and of a rigid material having a thickness not more than and preferably less than the thickness of the body of the cell frame which is made of an elastic material.

3

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a schematic exploded view showing an arrangement of the concentrating cell frames, diluting cell frames and ion exchange membranes in a filter-press type electrodialysis apparatus construded according to the present invention;

FIG. 2a is a cross-sectional view of the electrodialysis apparatus shown in FIG. 1, under assembled conditions, wherein the elements are secured between a pair of electrodes, taken along the line A'—A' of FIG. 1;

FIG. 2b is a schematic view showing a portion of the spacer means;

FIG. 3a is a plan view of either a diluting or concentrating cell frame used within the electrodialysis apparatus of the present invention;

FIG. 3b is a cross-sectional view of the cell frame of FIG. 3a, taken along the line B–B' in FIG. 3a;

FIG. 3c is a cross-sectional view of the cell frame of FIG 3a, taken along the line C–C' in FIG. 3a;

FIGS. 4a–c are cross-sectional views of various modifications of the connecting passages between the apertures of the cell frame for forming the liquid conduits and the central openings of the cell frame;

FIGS. 5a and 6a are plan views of other embodiments of the diluting cell frame and the concentrating cell frame which may be utilized within the present invention;

FIGS. 5b and 6b are cross-sectional views of the cell frames of FIGS. 5a and 6a taken along the lines D–D' and E–E' of FIGS. 5a and 6a respectively;

FIG. 7a is a schematic view illustrating the passage-defining means of the cell frames of FIGS. 5a or FIG. 6a;

FIG. 7b is a cross-sectional view of the passage defining means of FIG. 7a taken along the line F–F' of FIG. 7a;

FIG. 8a is a plan view of a portion of a cell frame having lattice type convex ribs upon the surface thereof; and FIG. 8b is a cross-sectional view of the cell frame of FIG. 8a taken along the line G–G' of FIG. 8a.

DETAILED DESCRIPTION OF THE PREFERRED EMBODIMENTS

Referring now to the drawings, and more particularly to FIG. 1 thereof, a filter-press type electrodialysis apparatus is shown as including cation exchange membranes 1 and anion exchange membranes 2 alternately arranged and interposed between membrane cell frames 3 or cell frames 4 which contain net-type spacers, shown in inserted condition in FIG. 2b, such assembly being arranged between a pair of electrodes and secured to a fastening frame, not shown. The cell frames 3 and 4 have a thickness of, for example, 0.7 – 3 mm, and have a picture frame configuration having a central rectangular opening therein. Thus, within the electrodialysis apparatus, ion-diluting cells and ion-concentrating cells, which are referred to as whole cells, are alternately formed, each cell having the net-type spacers inserted therein, the cell frames which form ion-concentrating cells and ion-diluting cells being referred to as concentrating cell frames and diluting cell frames, respectively.

The concentrating cell frames and the diluting cell frames have vertically disposed passages 6 connecting the central opening to horizontally disposed slots 5 for feeding the liquid to the cells or discharging the liquid from the cells. Slots 5 are provided at the peripheral portion of each cell frame and membranes at corresponding positions thereof, such that when the cell frames and the membranes are alternately assembled, the slots within the membranes and cell frames are aligned and in effect form conduits 7-10 for feeding the liquid into the apparatus or discharging the liquid from the apparatus. Within the apparatus, the diluting liquid is fed through conduit 7 and the passages 6 formed within the diluting cell frames to each of the diluting cells so as to be distributed within the cell and be electrodialyzed so as to discharge through the passages 6 and conduit 8 and be passed out of the apparatus.

On the other hand, the concentrating liquid is fed through the conduit 9 and passages 6 of the concentrating cell frames so as to be conducted to the concentrating cells, the concentrating liquid fed into the concentrating cells being distributed therewithin, electrodialyzed, and discharged through the passages 6 of the concentrating cell frames and the conduit 10 so as to be conducted out of the apparatus. Thus, the diluting liquid and the concentrating liquid are fed to the apparatus and discharged therefrom after the electrodialysis.

Referring now to FIG. 2a, the apparatus is disclosed wherein the elements are fastened between a pair of electrodes, the reference character 11 designating a concentrating cell while the reference character 12 designates a diluting cell, spacers 13 and 14 of the concentrating cell and the diluting cell, respectively, being suitably provided. FIGS. 3a–3c disclose a frame, which may be either a diluting cell frame or a concentrating cell frame, utilized with the filter-press type electrodialysis apparatus of the present invention, the spacer shown within FIG. 2a being of net-type material which may usually be made of plastic, such as for example, polyethylene, polypropylene, polyvinylchloride, or the like, and whose thickness is preferably the same as that of the cell frames. The spacers prevent mutual contact between the ion exchange membranes and provide uniform distribution of the liquid within the cells.

FIG. 3a is a plan view of a cell frame, which may be either a diluting cell frame or a concentrating cell frame, wherein apertures 15 and 16 are provided for forming conduits for feeding the liquid to the apparatus and for discharging the liquid from the apparatus, respectively, and the frame also includes passage portions 17 for connecting the apertures 15 and 16 with the central frame opening. Normally, such passages 17 connecting the apertures, forming the fluid conduits, to the central opening within the diluting cells are formed at upper or lower sides within all of such frames, and are alternately arranged, thus changing the relative positions of such apertures within the upper and lower sides whereby the liquid is uniformly distributed within the diluting cells. The passages connecting the apertures, forming the fluid conduit, to the central opening within the concentrating cells are formed similarly to those within the diluting cells but not in correspondence therewith whereby the positions of the passages within the concentrating cells do not align with those of the adjacent diluting cells. The passage portions of the frame are formed by a process separate from that process forming the body of the frame.

In accordance with the present invention, the thickness of the passage portions of the frame should not be greater than the thickness of the body of the frame and the portions of the frame defining the passages should be made of a rigid material. As a composite structure, the passage portions of the frame are not compressed as a result of fastening and assembling the frame members, the ion-exchange membranes, and the spacers between the pair of the electrodes, even though the bodies of the frames are compressed, due to the fact that the passage defining portions are in fact constructed of a rigid material. Preferably, the thickness of the passage portions should be less than the thickness of the body of the frame member, as best seen in FIGS. 3b and 3c, such that upon assembly, the body portion of the frame will be compressed and will have a thickness equivalent to the thickness of the frame portions defining the passage parts of the frame. Such passage parts of the frame formed in the foregoing manner are preferably prepared by a combination of two mating pieces 18 and 19, as best shown in FIGS. 4a and 4b, although it is also possible to prepare the same from a single plate within which suitable holes are formed, and when the two pieces of the frame member defining the passages are combined and such frame portion is assembled to the main body of the frame, the component parts can be adhered together with a suitable bonding agent.

The body of the frame is usually made of an elastic material, preferably a rubber-like elastic material having a 30°–110°, and more especially 40°–95° of hardness, as measured by the Japanese Industrial Standard K-6301, such material being for example, natural or synthetic rubber, for example, styrene-butadiene rubber, chloroprene rubber, or epichlorohydriene rubber, or a synthetic resin, for example, polyethylene resin, polyvinylchloride, or an ethylene-vinylacetate copolymer preferably having a vinylacetate content of 5–30% by weight. The rigid material of the frame defining the passage portions thereof can be either metal, a crosslinked resin, or a substantially incompressible resin, for example, a polypropylene resin, a hard type polyvinylchloride resin, a high crosslinked polyester resin, or a high density polyethylene resin acrylonitrilebutadienestyrene resin which is preferably one having a 70°–140°, and more especially 80°–120° of Rockwell hardness B as measured by the Japanese Industrial Standard B-7726.

As has already been noted heretofore, it is quite important to form the portion of the frame defining the passages so as to have a thickness, not more than, and preferably less than the thickness of the body of the frame and to use a rigid material therefor. In conjunction with such, it is further noted that the material of which the passage defining parts of the cell frame can be made of may be rigid plastics which are not compressed under pressures of 1–10 kg/cm$^2$ while the material of which the body portion of the cell frame can be made of may be rubber-like elastic material which is compressed under pressures of 1–10 kg/cm$^2$. In assembling the electrodialysis apparatus of the present invention, the peripheral portions of the cell frames as well as the passages within the frames from which leakage of the liquid normally occurs, will tend to be compressed by adjacent compressible frame bodies whereby leakage of the liquid is prevented due to the compressibility and elasticity of the body frame members. Moreover, as a result of the passage defining portions of the frames being made of the noted rigid material, the current density of the apparatus, is desirably limited.

It should also be noted that as the passages are in effect feeding means for supplying the liquid to each of the cell chambers from the conduits, it is extremely important to uniformly distribute such liquid to and within the cell chambers. In addition, as the passage defining portion of the frame is made of rigid material which is not compressed as a result of assembling the frame apparatus, the passageway per se is not compressed and can be maintained in the same shape whereby leakage of the liquid is prevented. Maintaining such configuration of course imparts or facilitates a constant feeding of the liquid to the cells, especially the diluting cells, without being adversely affected by the assembly conditions and also serves to impart or facilitate uniform distribution of the liquid within and to the cells as well as maintaining a constant, limited current density within each cell.

As is clearly understood from the foregoing description of the apparatus of the present invention, the thickness and the material of the frame portion defining the passages, which is formed separately from the main body of the frame, are mutually related. When for example, the thickness of the frame body is substantially greater than the thickness of the frame portion defining the passages, the material of the frame body should be made of a high compressible elastic material compared to that of the passage defining portion of the frame. When the thickness of the frame body is only slightly greater than that of the passage defining portion of the frame, the material of the frame body need only be slightly more compressible when compared to the material of the passage defining portion of the frame.

With respect to the relation between the thickness of the frame body and that of the passage defining portion of the frame, it is preferable that the thickness of the passage defining portion of the frame be 1/100–1/10, and especially 3/100–7/100, less than the thickness of the frame body. When the thickness of each part is the same, a substantially large force is required to secure the component parts together for preventing of leakage of the liquid. Accordingly, deterioration of the frame material due to such forces and the concomitant wear is rapid, and such forces also cause strain of the frame cells which result in a substantial decrease to the limiting current density. The thickness of the frame body and/or the passage defining portion of the frame are usually formed within an accuracy of 3/100–5/100 wherein the thickness represents the average thickness.

Within the electrodialysis apparatus of the present invention, it is also preferable to form a plurality of convex ribs, in a lattice configuration upon the surface of the frame body, whereby leakage of the liquid is further decreased and the assembled elements of the apparatus can be secured together by means of fastening forces which have low strain and stress values but which nevertheless are sufficient to prevent leakage. With respect to this feature, line contact of the frame results as opposed to surface contact, and consequently, accuracy in accomplishing uniformity of thickness of the frame can be neglected. One embodiment of the lattice-type ribs is shown in FIGS. 8a and 8b. The ribs can be formed upon the surface of the frame by a molding process utilizing an engraved roller or by pressing a flat frame with an engraved roller, and it is preferable to form the ribs upon only one side of the frame body.

The size and height of the ribs upon the surface of the frame can be suitably selected, and are preferably 0.05–0.3 and more preferably 0.08–0.15, times the thickness of the frame. Since the assembly forces can be decreased by this feature, the life of the ion-exchange membranes, the frame, or the like can therefore be prolonged. Moreover, in fastening together the elements of the electrodialysis apparatus of the present invention, when the peripheral portion of the net type spacers are bonded upon or to the inner peripheral portions of the cell frames facing the central openings, the assembly and disassembly of the elements becomes quite easy, the resistance strength of the frame against inner pressure exerted upon the frame can be increased, and also the limiting current density of the apparatus can be increased.

The above-noted phenomena are due to the fact that the net-type spacer is prepared so as to have a size which is able to cover the entire area of the cells so as to impart uniform distribution of the liquid therewith. However, the position of the spacers usually deviate from the normal intended positions within the cells because of several factors, such as for example, the inferior skill of assembling the components, the hydraulic pressure of the liquid passing through the cells, the weight of the spacers, and the like, the result being a non-uniform distribution of the liquid within the cells, unless means for securely bonding the spacers is obtained. Such means for bonding the spacers upon the frames is shown in FIG. 2a wherein it is seen that the bonding of the spacers with the frames is preferably performed at more than one surface portion of the corresponding positions of the frame and the spacer. The bonding manner preferably includes forming a plurality of concavities upon the frame so as not to increase the thickness thereof and to bond the spacers therewithin with suitable bonding agents, such as for example, an epoxy type bonding agent, or alternatively, to adhere the components together by heat-sealing means. Further appreciation of the invention can be obtained by means of certain specific examples which are provided herein for purposes of illustration only and are not intended to be limiting in any manner.

EXAMPLE I

A diluting cell frame made of chloroprene rubber having a degree of hardness of 50 and having the shape shown in FIGS. 5a and 5b, the size of which measured 55 cm × 18 cm, a thickness of 2.0 mm, the size of the central opening being 39 cm × 13 cm, and including four apertures for forming the upper and lower conduits, was prepared. A concentrating cell frame made of the same material and having the same structure and the shape shown in FIGS. 6a and 6b was also prepared. Within the passage portion of both cell frames, a member made of polypropylene having a degree of hardness of 100 and a thickness of 1.9 mm and which has the shape shown in FIGS. 7a and 7b was inserted as the passage defining portion of the frame so as to provide connecting conduit means between the central opening and the apertures.

A filter-press type electrodialysis apparatus having 49 concentrating cells and 50 diluting cells, exhibiting no leakage of the liquid from the apparatus, was assembled as follows:

The diluting cell frames and the concentrating cell frames, within which net-type spacers made of polyethylene having a thickness of 2.0 mm and a size measuring 38.8 × 12.8 cm are inserted, were arranged alternately together with cation exchange membranes, having a thickness of 110$\mu$, specific resistance of 180$\Omega$-cm and a transport number of Na+ 0.91 <, and anion exchange membranes having a thickness of 110$\mu$, specific resistance of 170$\Omega$-cm, and a transport number of Cl - 0.93 <, as shown in FIG. 1.

The transport number of the membranes is calculated from the membrane potential when placed within a sodium chloride solutions of 0.5 mol and 1.0 mol. The components were secured between a pair of electrodes, made of platinum plated with titanium, the fastening frames being placed under a pressure of 3 kg/cm$^2$. Two hundred (200) liters of a solution containing 3000 ppm of sodium chloride was fed, at 25°C, within the diluting cells at a rate of 5 cm/sec., which was the average linear velocity, to the membranes, and the same solution was fed to the concentrating cells, the solution being electrodialyzed by applying 80 volt thereto. The limiting current density of the apparatus was 34 A/dm$^2$N and the distribution of the solution within all of the cell chambers was substantially uniform.

After 1 hour and 40 minutes from the initiation of voltage applications, the electrodialyzed solution was demineralized so as to be 500 ppm of sodium chloride, and the current efficiency was 82%.

REFERENCES

Each one of the filter-press type electrodialysis apparatus was assembled and included modifying the material and/or thickness of the passage defining portion of the frame of the apparatus of Example 1 as follows:

1. The thickness of the passage defining portion of the frame was 2.1 mm which was thicker than the body of the frame although constructed of the same material. (See Reference 1).

2. The passage defining portion of the frame was made of an ethylene-vinyl-acetate copolymer (vinylacetate content being 40% and a degree of hardness of 40), the component parts having the same thickness. (See Reference 2).

3. The passage portion of the frame was made of the same material as in Reference 2 and had a thickness of 2.1 mm. (See Reference 3)

The pressure required for fastening together the elements of the assembly, until there was no leakage of the solution from the apparatus, and the limiting current density of such electrodialysis apparatus, were as follows:

|  | Pressure for fastening | Limiting current density |
|---|---|---|
| Reference 1 | 4.5 kg/cm$^2$ | 34 A/dm$^2$N |
| Reference 2 | 3.0 kg/cm$^2$ | 24 A/dm$^2$N |
| Reference 3 | 2.5 kg/cm$^2$ | 19 A/dm$^2$N |

EXAMPLE II

The diluting cell frames and the concentrating cell frames shown in FIGS. 8a and 8b having lattice-like ribs having a height of 0.3 mm and a pitch of 10 mm upon one side of the surface, were utilized within the electrodialysis apparatus of Example 1 which was assembled under a fastening pressure of 3.0 kg/cm². The same solution was fed to the diluting cells and to the concentrating cells so as to form a higher pressure difference of 50mmHg to the diluting cells. The internal leakage from the diluting cells to the concentrating cells was 13 liter/hours, and when the test was conducted within the electrodialysis apparatus of Example 1, the internal leakage was 38 liter/hour while when conducted within the apparatus of Example 2, the fastening pressure required for providing internal leakage at the rate of 38 liter/hour was approximately 2.5 kg/cm².

EXAMPLE III

Within the assembly of the electrodialysis apparatus of Example 1, the net type spacers made of polyethylene were bonded to the cell frames along the concave portions thereof and at the inner peripheral portions of the central opening, as shown in FIGS. 2a and 3a with an epoxy type bonding agent. The demineralization of the solution of sodium chloride was performed under the conditions of Example 1 and the limiting current density of the apparatus was 40 A/dm²N.

Obviously, many modifications and variations of the present invention are possbile in light of the above teachings. It is to be understood therefore that within the scope of the appended claims the present invention may be practiced otherwise than as specifically described herein.

What is claimed as new and desired to be secured by Letters Patent of the United States is:

1. A filter-press type electrodialysis apparatus comprising:

a plurality of alternately arranged anion exchange membranes and cation membranes having cell frames interposed between said membranes, said membranes and frames being arranged and fastened between a pair of electrodes;

said cell frames include a central opening, conduits for feeding or discharging the liquid to be electrodialyzed to or from said cell frames, and passages connecting said conduits to said central openings; and wherein the portion of said frame defining said passages comprise inserts formed separately from the body of said cell frame and which are of a rigid material having a thickness less than the thickness of said cell frame body which is made of an elastic material.

2. The electrodialysis apparatus as set forth in claim 1, wherein the thickness of said passage defining portion of said cell frame is 1/100–1/10 less than the thickness of said body of said cell frame.

3. The electrodialysis apparatus as set forth in claim 1, wherein the rigid material of said passage defining portions has a 70°–140° of Rockwell hardness B as measured by the Japanese Industrial Standard B-7726 while the elastic material of said frame body has a 30°–110° degree of hardness as measured by the Japanese Industrial Standard K-6301.

4. The electrodialysis apparatus as set forth in claim 1, wherein the material of said passage defining portions of said cell frame is made of a rigid plastic which is incompressible under a pressure within the range of 1 – 10 kg/cm² while the material of the frame body is made of a rubberlike elastic material which is compressible under a pressure within the range of 1 – 10 kg/cm².

5. The electrodialysis apparatus as set forth in claim 1, wherein convex ribs, disposed within a lattice array are provided upon the surface of said frame body.

6. The electrodialysis apparatus as set forth in claim 5, wherein the thickness of said convex ribs is 0.05 – 0.3 times the thickness of said frame body.

7. The electrodialysis apparatus as set forth in claim 1, wherein spacers are respectively disposed within said cell frames and are bonded to at least one inner peripheral portion of said cell frame facing said central opening.

* * * * *